Patented July 17, 1928.

1,677,823

UNITED STATES PATENT OFFICE.

HEINRICH GÜNZLER AND OSKAR NEUBERT, OF ELBERFELD, GERMANY, ASSIGNORS TO WINTHROP CHEMICAL COMPANY, INC., OF NEW YORK, N. Y.

POLYHYDROXY-MERCURY COMPOUND.

No Drawing. Application filed May 5, 1927, Serial No. 189,173, and in Germany January 20, 1926.

Mercurized polyhydroxy compounds of the benzene series have not been used heretofore for disinfecting purposes, for instance, for the disinfection of seed, because they have been practically unknown and further because the single instance of such compounds described in the literature, i. e., a resorcin-mercury compound described in Dimroth's Berichte, vol. 35, page 2865, is too unstable for practical use.

It has now been found that the mercurization of polyhydroxy compounds of the benzene series takes place even at atmospheric temperatures when a dry finely divided mixture of the polyhydroxy compound and the mercurizing agent is simply dissolved in water, a solution of the mercurized polyhydroxy compound being directly produced, i. e., the reaction takes place during the dissolving operation. The reaction under these conditions moreover, is so complete that no mercury oxid or hydroxid is precipitated from the resulting solution upon the addition of caustic alkali. The dissolving of the components of the dry mixture, i. e., mercurizing agent and polyhydroxy compound of the benzene series, may be hastened by the addition to the mixture of a solution promoting agent such as sodium chloride.

On account of the acid reaction of the mercury salts used for mercurizing the polyhydroxy compounds and the acid reaction of some of the polyhydroxy compounds themselves, the mixtures thereof and the solutions prepared therefrom may exhibit an undesirable acid reaction. This acidity may be neutralized by means of suitable alkalies, such as soda, giving neutral products.

The mercurized polyhydroxy compounds may be combined with other water-soluble disinfecting agents.

The mercurized polyhydroxy compounds of the present invention have the advantages that they are odorless, colorless and stable. Not only the mercurized-polyhydroxy compounds but also the dry mixtures of the components are colorless and stable. They may be heated to as high as 95 to 100° C. without decomposition or damage. The mercurized-polyhydroxy compounds may be obtained in dry powdered form by evaporating the solutions thereof prepared as described above and pulverizing the solid residues. The products are unusually effective for the treatment of seed and for the destruction of animal and plant pests, i. e., as insecticides and fungicides.

As will be apparent, the invention has the great advantage that the mercurized-polyhydroxy compounds need not be supplied to the user as such, either in solution or as the pulverized products obtained by evaporating their solutions and grinding the residue, but the dry mixture of the components may be supplied and the user need only to dissolve this mixture in water as directed.

The following examples are illustrative:

Example 1.—11.0 parts by weight of resorcin and 27.0 parts by weight of mercuric chloride are pulverized and mixed and the mixture dissolved in water whereby reaction takes place so that no mercury oxide precipitates upon the addition of soda to the solution. The solution may be used directly or evaporated and the residue ground to a powder which may be dissolved in water for use as required.

Example 2.—24.8 parts by weight of 1-methyl 2.6-dihydroxy benzene, 27.0 parts by weight of mercuric chloride and 27.0 parts by weight of sodium chloride are pulverized and mixed and the mixture dissolved in water. The solution can be used directly as a disinfectant or it may be treated as described in Example 1.

Example 3.—12.6 parts by weight of pyrogallol, 27.1 parts by weight of mercuric chloride and 30.0 parts by weight of sodium chloride are pulverized and mixed and the mixture dissolved in water and further treated as described in Example 1.

Example 4.—11.0 parts by weight of resorcin, 27.0 parts by weight of mercuric chloride, 30.0 parts by weight of potassium chloride and 10.0 parts by weight of copper sulfate crystals are pulverized and mixed and the mixture dissolved in water. The solution may be used directly or further treated as described in Example 1.

Claims:

1. As a new product, the reaction product of resorcin and mercuric chloride which is a stable material, readily soluble in water and has a strong disinfecting action.

2. As an insecticide and fungicide, the reaction product of a polyhydroxy compound of the benzene series with a water-soluble mercury salt which reaction product is a stable material readily soluble in water and has a strong disinfecting action.

3. As an insecticide and fungicide, the reaction product of resorcin and a water soluble mercury salt which reaction product is a stable material readily soluble in water and has a strong disinfecting action.

In testimony whereof we have hereunto set our hands.

HEINRICH GÜNZLER.
OSKAR NEUBERT.